Figure 1:
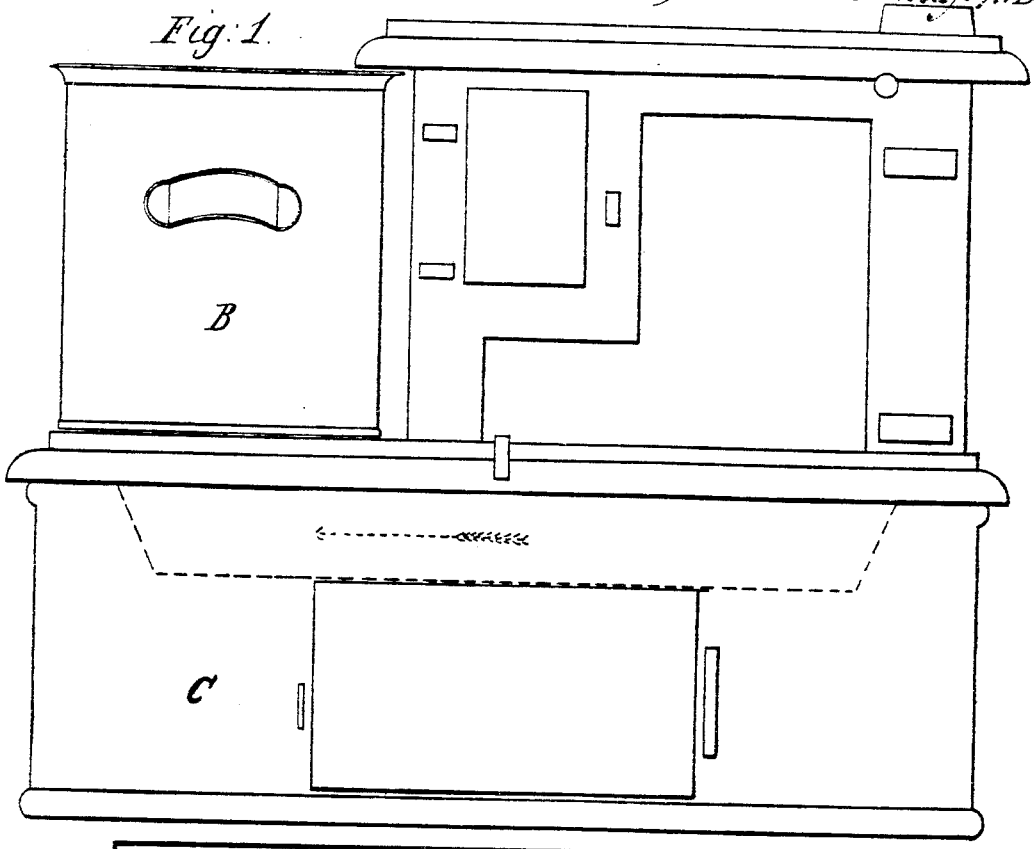
Figure 2:
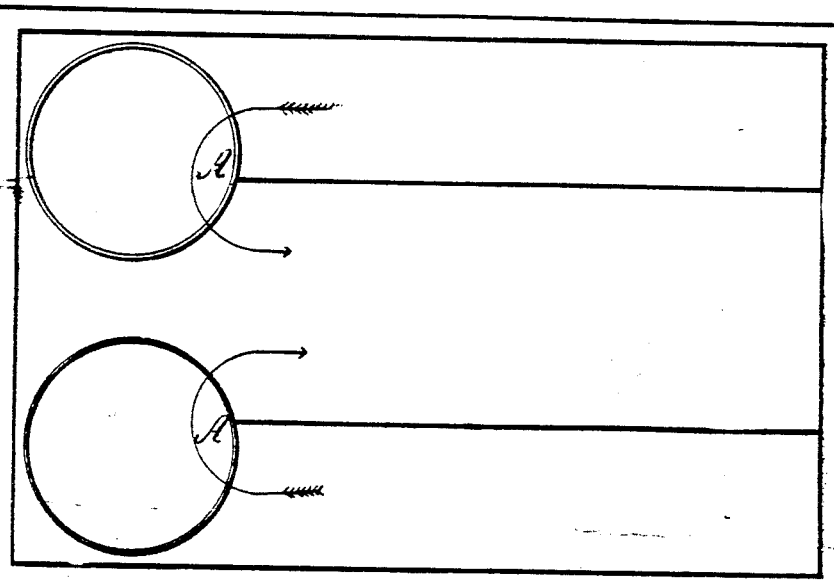

BEST AVAILABLE COPY

S. B. Spaulding,

Cook Stove.

No. 237. (A1) Patented May 17, 1859.

Witnesses;
H. N. Thomas
A. A. Nicholson

Inventor;
Samuel B. Spaulding

No. 237, to original Letters Patent No. 20,668.—*Improvement in Cooking Stoves.*—I claim the exte[illegible] of the flues under the hearth, substantially as described, for the purposes set forth.